(12) United States Patent
Seiler et al.

(10) Patent No.: US 7,634,520 B1
(45) Date of Patent: Dec. 15, 2009

(54) AUDIT TRAIL TOOLS FOR TRANSACTION SYSTEMS

(75) Inventors: Gregg A. Seiler, San Francisco, CA (US); Tom R. Wilson, San Francisco, CA (US)

(73) Assignee: Advent Software, Inc., San Francisco, CA (US)

( * ) Notice: Subject to any disclaimer, the term of this patent is extended or adjusted under 35 U.S.C. 154(b) by 288 days.

(21) Appl. No.: 11/245,842

(22) Filed: Oct. 7, 2005

(51) Int. Cl.
*G06F 17/30* (2006.01)

(52) U.S. Cl. .................... 707/204; 707/200; 707/102

(58) Field of Classification Search ................ 707/100
See application file for complete search history.

(56) References Cited

U.S. PATENT DOCUMENTS

| | | | | |
|---|---|---|---|---|
| 4,586,035 A | * | 4/1986 | Baker et al. | 345/157 |
| 5,301,319 A | * | 4/1994 | Thurman et al. | 707/103 R |
| 5,890,166 A | * | 3/1999 | Eisenberg et al. | 707/203 |
| 7,149,760 B1 | * | 12/2006 | Breuer | 707/203 |
| 7,246,137 B2 | * | 7/2007 | Paulus et al. | 707/104.1 |
| 7,277,900 B1 | * | 10/2007 | Ganesh et al. | 707/202 |
| 2002/0138497 A1 | * | 9/2002 | Chen et al. | 707/104.1 |
| 2005/0114409 A1 | * | 5/2005 | Sinha et al. | 707/203 |
| 2005/0120062 A1 | * | 6/2005 | Sinha et al. | 707/203 |
| 2005/0203871 A1 | * | 9/2005 | Devalla et al. | 707/1 |
| 2005/0209876 A1 | * | 9/2005 | Kennis et al. | 705/1 |
| 2007/0005665 A1 | * | 1/2007 | Vaitzblit et al. | 707/202 |

* cited by examiner

*Primary Examiner*—Yicun Wu
(74) *Attorney, Agent, or Firm*—K&L Gates LLP; Stephen C. Glazier

(57) ABSTRACT

An audit system structured for auditing at least one operational table of a transaction system during an audit event is provided. In an embodiment, the audit system includes at least one audit history table operatively associated with the operational table of the transaction system, and the audit history table includes at least one database trigger configured for monitoring one or more data changes in the operational table. The audit history table is configured to capture substantially all data changes which occur in the transaction system during the audit event by using a row-versioning mechanism for storing the data changes in the audit history table as audit event data. The audit history tables are configured to function separately from the operational tables of the transaction system.

22 Claims, 18 Drawing Sheets

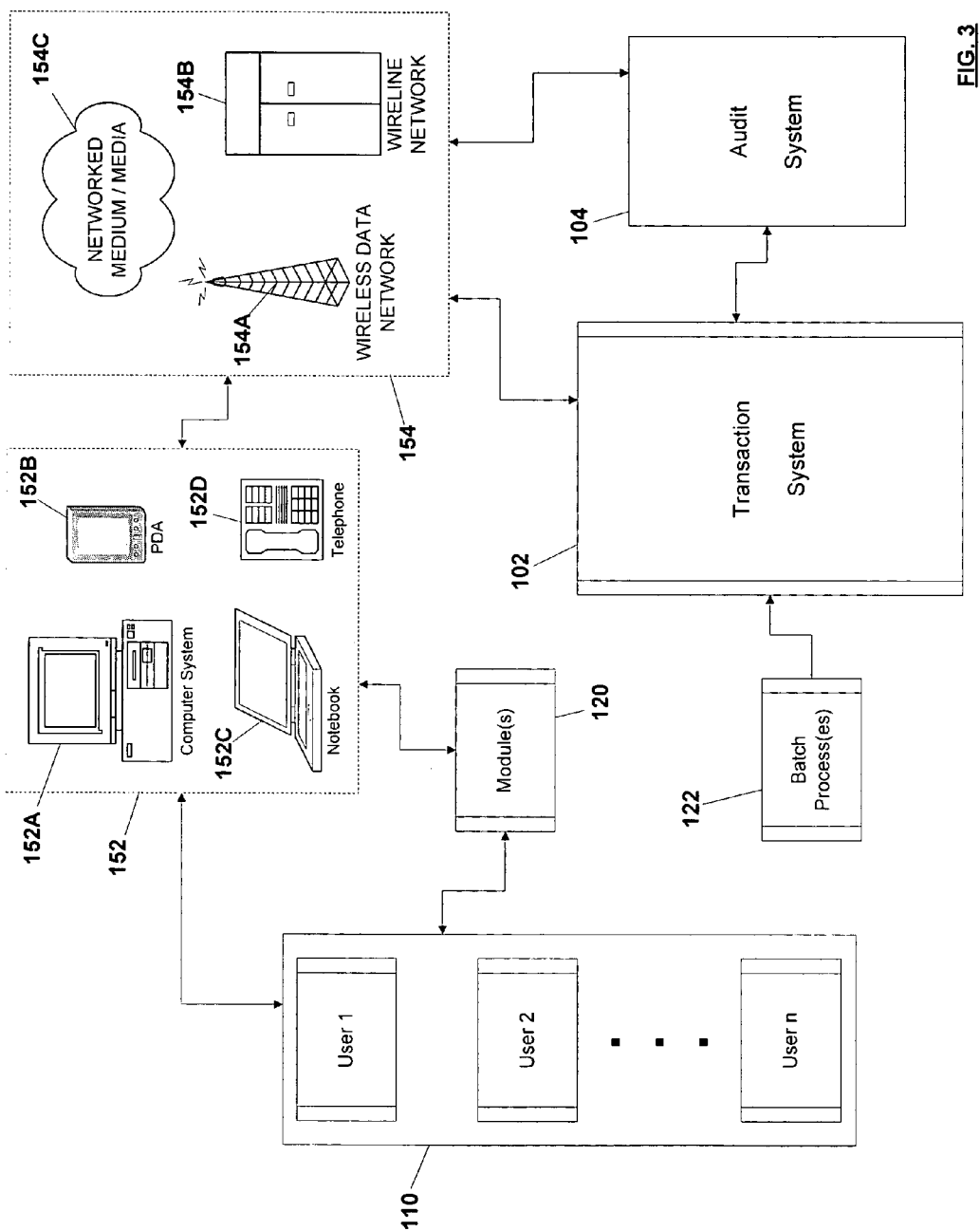

| Column Name | Data Type | Description |
|---|---|---|
| AuditTypeCodeIn | Char | Defines the row-level action type that created this row, either 'I' for insert, or 'U' for update. |
| AuditEventIDIn | Integer | Foreign key to the AuditEvent table. Defines the audited event that this row is part of. |
| AuditTimeStamp | Binary | Unique integer within the database that is incremented with each change to the database. |

| Column Name | Data Type | Description |
|---|---|---|
| AuditTypeCodeOut | Char | Defines the row-level action type that made this row obsolete, either 'D' for delete, or 'U' for update. |
| AuditEventIDOut | Integer | Foreign key to the AuditEvent table. Defines the audited event for which the obsolescence of this row is required. |

FIG. 6

| Column Name | Data Type | Description |
|---|---|---|
| AuditID | Integer | Primary Key – unique auto-generated ID for an audited action. Audited actions can be as atomic as updating a single field, or can identify a complex operation such as a repost which must back out and re-insert multiple rows. It can even identify an event which caused updates to rows in multiple tables. |
| ActionDate | DateTime | Date and time the user performed the action. |
| ActionUserID | Integer | Foreign key to AoUser to identify the user performing the action. |
| ModuleID | Integer | A foreign key to the Modules table, to record which module the user used to make create the event: User Interface, Post, Batch Script, etc. |
| JobID | Integer | A foreign key to the JobHistory table to record the job by which the action occurred. This allows queries of the parameters for the job and other historical information. |

| Column Name | Data Type | Description |
|---|---|---|
| AuditID | Integer | Foreign key to the QbAuditTrail table to identify the auditable event this row is part of. |
| TableName | String | Name of the table that was updated as part of this auditable event. This column lets us know which tables to select affected rows from. |
| AuditObjectID | Integer | When a program knows that it is making an update to a single object, it may record the parent AuditObject-level ID here. For instance if the User Interface Transaction Editor made an update to a portfolio's transactions, it would place the PortfolioID here. |

| AuditEvent | | | |
|---|---|---|---|
| AuditID | User ID | Action Date | Module |
| A1 | Joe | 12/1/02 | Post |
| A2 | Joe | 12/1/02 | User Interface |

FIG. 8B

| AuditEventTable | |
|---|---|
| AuditID | TableName |
| A1 | PortTrans |
| A2 | PortTrans |

FIG. 8C

PortfolioTransaction Audit

| RecID | Port ID | Trans Date | Trans Type | Sec ID | Lot ID | Amt | Audit Type Code In | Audit Time Stamp | Audit Event IDIn | Audit Type Code Out | Audit Event IDOut |
|---|---|---|---|---|---|---|---|---|---|---|---|
| | | | | | | | | | | | |

FIG. 8D

PortfolioTransactions

| RecID | Port ID | Trans Date | Trans Type | Sec ID | Lot ID | Amt | Type In | Time StampIn | Audit IDIn |
|---|---|---|---|---|---|---|---|---|---|
| T1 | Por1 | 12/1/02 | by | IBM | 1 | 500 | I | 12/1/02 | A1 |
| T2 | Por1 | 12/1/02 | by | MSFT | 1 | 400 | I | 12/1/02 | A2 |

FIG. 9A

AuditEvent

| Audit ID | User ID | Action Date | Module |
|---|---|---|---|
| A1 | Joe | 12/1/02 | Post |
| A2 | Joe | 12/1/02 | User Interface |
| A3 | Sue | 12/2/02 | User Interface |

FIG. 9B

AuditEventTable

| AuditID | TableName |
|---|---|
| A1 | PortTrans |
| A2 | PortTrans |
| A3 | PortTrans |

FIG. 9D

PortfolioTransaction Audit

| RecID | Port ID | Trans Date | Trans Type | Sec ID | Lot ID | Amt | Audit Type Code In | Audit Time Stamp | Audit Event IDIn | Audit Type Code Out | Audit Event IDOut |
|---|---|---|---|---|---|---|---|---|---|---|---|
| T2 | Por1 | 12/1/02 | by | MSFT | 1 | 400 | I | 12/1/02 | A2 | D | A3 |

FIG. 9C

PortfolioTransactions

| RecID | Port ID | Trans Date | Trans Type | Sec ID | Lot ID | Amt | Type In | Time StampIn | Audit IDIn |
|---|---|---|---|---|---|---|---|---|---|
| T1 | Por1 | 12/1/02 | by | IBM | 1 | 500 | I | 12/1/02 | A1 |

FIG. 10A

| AuditEvent | | | |
|---|---|---|---|
| Audit ID | User ID | Action Date | Module |
| A1 | Joe | 12/1/02 | Post |
| A2 | Joe | 12/1/02 | Editor |
| A3 | Sue | 12/2/02 | Editor |
| A4 | Bill | 12/3/02 | Editor |

FIG. 10B

| AuditEventTable | |
|---|---|
| AuditID | TableName |
| A1 | PortTrans |
| A2 | PortTrans |
| 3 | PortTrans |
| 4 | PortTrans |

FIG. 10C

PortfolioTransaction Audit

| RecID | Port ID | Trans Date | Trans Type | Sec ID | Lot ID | Amt | Audit Type Code In | Audit Time Stamp | Audit Event ID In | Audit Type Code Out | Audit Event ID Out |
|---|---|---|---|---|---|---|---|---|---|---|---|
| T2 | Por1 | 12/1/02 | by | MSFT | 1 | 400 | I | 12/1/02 | A2 | D | A3 |
| T1 | Por1 | 12/1/02 | by | IBM | 1 | 500 | I | 12/2/02 | A1 | U | A4 |

FIG. 10D

PortfolioTransactions

| RecID | Port ID | Trans Date | Trans Type | Sec ID | Lot ID | Amt | Type In | Time StampIn | Audit ID In |
|---|---|---|---|---|---|---|---|---|---|
| T1 | Por1 | 12/1/02 | by | IBM | 1 | 5000 | U | 12/3/02 | A4 |

FIG. 11A

HistTradeBlotter

| Rec ID | Status | Port ID | Trans Date | Trans Type | Sec ID | Amt | AuditType CodeIn | Audit Time Stamp | Audit Event IDIn | AuditType CodeOut | Audit Event IDOut |
|---|---|---|---|---|---|---|---|---|---|---|---|

FIG. 11B

TradeBlotter

| Rec ID | Status | Port ID | Trans Date | Trans Type | Sec ID | Amt | AuditType CodeIn | Audit Time Stamp | Audit Event IDIn |
|---|---|---|---|---|---|---|---|---|---|
| B1 | New | Por1 | 1/25/03 | sl | ORCL | 1000 | I | 1/24/03 | H18 |
| B2 | New | Por1 | 1/25/03 | by | ADVS | 7000 | I | 1/24/03 | H19 |

FIG. 11C

AuditEvent

| Audit ID | User ID | Action Date | Module |
|---|---|---|---|
| A20 | Joe | 1/25/03 | Post |

AuditEventTable

| AuditID | TableName |
|---|---|
| A20 | Blotter |
| A20 | 1. PortTrans |

FIG. 11D

HistTradeBlotter

| Rec ID | Status | Port ID | Trans Date | Trans Type | Sec ID | Amt | Audit Type Code In | Audit Time Stamp | Audit Event IDIn | Audit Type Code Out | Audit Event IDOut |
|---|---|---|---|---|---|---|---|---|---|---|---|
| B1 | New | Por1 | 1/25/03 | sl | ORCL | 1000 | I | 1/24/03 | A18 | U | A20 |
| B2 | New | Por1 | 1/25/03 | by | ADVS | 7000 | I | 1/24/03 | A19 | U | A20 |

FIG. 11E

TradeBlotter

| Rec ID | Status | Port ID | Trans Date | Trans Type | Sec ID | Amt | Type In | Time StampIn | Audit IDIn |
|---|---|---|---|---|---|---|---|---|---|
| B1 | Rejected | Por1 | 1/25/03 | sl | ORCL | 1000 | U | 1/25/03 | A20 |
| B2 | Posted | Por1 | 1/25/03 | by | ADVS | 7000 | U | 1/25/03 | A20 |

FIG. 11F

PortfolioTransaction Audits

| RecID | Port ID | Trans Date | Trans Type | Sec ID | Lot ID | Amt | Audit TypeCode In | Audit Time Stamp | Audit Event IDIn | Audit TypeCode Out | Audit Event IDOut |
|---|---|---|---|---|---|---|---|---|---|---|---|

FIG. 11G

PortfolioTransactions

| RecID | Port ID | Trans Date | Trans Type | Sec ID | Lot ID | Amt | Type In | Time StampIn | Audit IDIn |
|---|---|---|---|---|---|---|---|---|---|
| T21 | Por1 | 1/25/03 | by | ADVS | 1 | 7000 | I | 1/25/03 | A20 |

AUDIT TRAIL TOOLS FOR TRANSACTION SYSTEMS

FIELD OF THE INVENTION

The present invention generally relates to capturing, recording and/or processing changes to data stored in a computer-based transaction system. The invention more particularly relates to processing, storing and presenting audit event data in association with data changes in a computer-based transaction system.

BACKGROUND

For many commercial enterprises, it is a challenge to implement information technology strategies that can deal effectively with the constantly changing and accelerating data requirements of the business world, especially in the financial services area. Effective and efficient systems and processes are essential to the success of any business that needs to capture, store, and manipulate transaction data and, for audit purposes, to track and report changes made to the data.

For example, a variety of regulatory requirements (e.g, SEC, Sarbanes-Oxley, Patriot Act, Anti-Money Laundering, and others) have been imposed on financial service providers that drive the need for more comprehensive financial recordkeeping. Each of these regulatory requirements often demands its own peculiar data report format and content from the service provider. This often results in placing stressful demands on the time and resources of the service provider to prepare accurate and complete reports of the necessary transaction data.

The SEC, for example, typically requests the following information from a financial service provider: account transfers—list all transfers between client accounts during a given time period; account activity—list all activity for each client account during a given time period; new accounts—list all new accounts that a firm began managing during a given time period; and, closed accounts—list all accounts that a firm stopped managing during a given time period.

In many situations, the interaction of a user with a transaction system involves work that spans multiple tables, and potentially multiple database-level transactions. Many conventional audit systems only capture database changes on an individual table-by-table basis, however, and cannot assemble and summarize the data changes into an intelligible format for the user to review and use. For audit reasons, many conventional applications maintain all historical data records within the same tables as the operational data of a transaction system. This creates operational overhead, however, when users attempt to access current data, and it adds complexity when users try to archive or retrieve historical data in association with performing an audit.

In view of the issues and problems described above, more effective and efficient systems and processes are needed that can address the deficiencies of conventional systems and processes for auditing data changes in transaction systems.

BRIEF DESCRIPTION OF THE FIGURES

The utility of the embodiments of the invention will be readily appreciated and understood from consideration of the following description of the embodiments of the invention when viewed in connection with the accompanying drawings.

FIG. 3 includes a schematic diagram illustrating aspects of an example audit system provided in accordance with an embodiment of the invention;

FIGS. 4 through 7 illustrate examples of columns or data fields that may be included in a table structured in association with an embodiment of the invention;

FIGS. 8A through 11G include schematic versions of tables that illustrate examples of various auditing processes that may be conducted in accordance with an embodiment of the invention; and, FIGS. 12 through 18 include screen displays of an example of an audit trail viewer that may be provided in accordance with an embodiment of the invention.

DESCRIPTION

As applied herein, the term "user" may include an investor, a financial service provider, a financial advisor, system administrators, or any other entity permitted to interface with various embodiments of the present invention.

The term "transaction system" includes any computer system having an operatively associated database capable of storing transaction related data. Examples of "transaction systems" include, without limitation, financial transaction systems, investment management systems, trading systems, recordkeeping systems, and accounting systems. For example, the transaction system marketed as "Advent Portfolio Exchange" or "APX" (offered by Advent Software, Inc.) is one example of a financial transaction system that can be configured for use in conjunction with various embodiments of the present invention.

The term "data change" includes any manipulation of data, such as data in a table of a database, for example. Examples of "data changes" include data insertions, data deletions, and data updates.

The term "audit event" may include, for example, (1) an event that may trigger an audit of data and data changes in a database that correspond to that event, or (2) a collection of data changes that occur during a given time period in a database or during a defined communication session with a database, that may correspond to an event for which the database may be audited.

The term "module" is sometimes used herein to refer to any device or functionality that permits a user to access a transaction system or an audit system (as described herein). Examples of "modules" include, without limitation, web interfaces and graphical user interfaces.

Various embodiments of the present invention provide auditing methods and systems that can be configured and executed to track, summarize, and/or process data changes associated with the data stored in a transaction system. For purposes of auditing a transaction system, embodiments of the invention can be employed to track system data manipulated by multiple users and can reconstruct historical events and their associated data changes. The invention may employ an application-level implementation strategy to capture and summarize all database-level data changes related to a particular entity, such as an investment portfolio or an investor, for example. In addition, in various embodiments, the invention can be configured to optimize run-time operations of a transaction system by separating audit event data tables from the operational tables of the transaction system.

Figure 1:
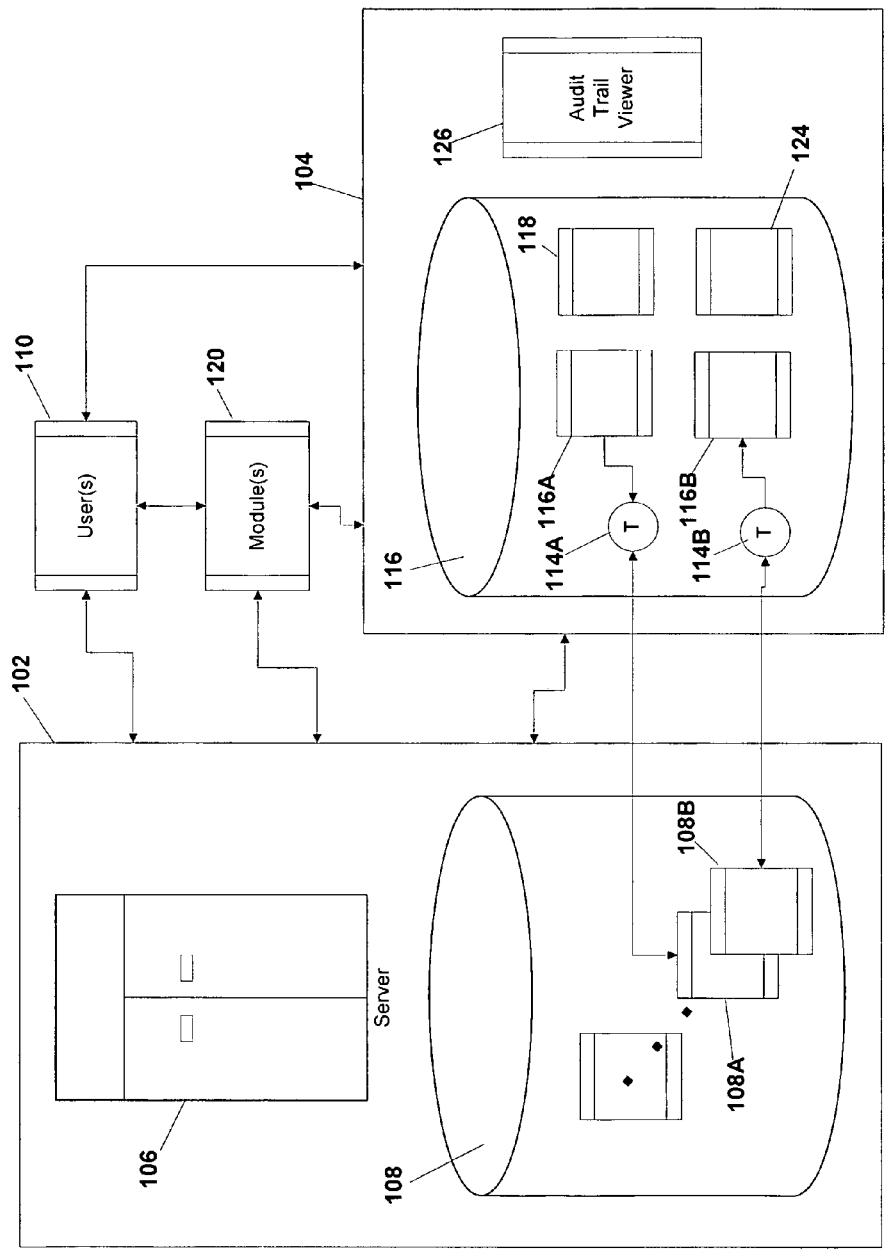
FIG. 1 includes a schematic diagram illustrating aspects of an example audit system provided in accordance with an embodiment of the invention.
Figure 2:
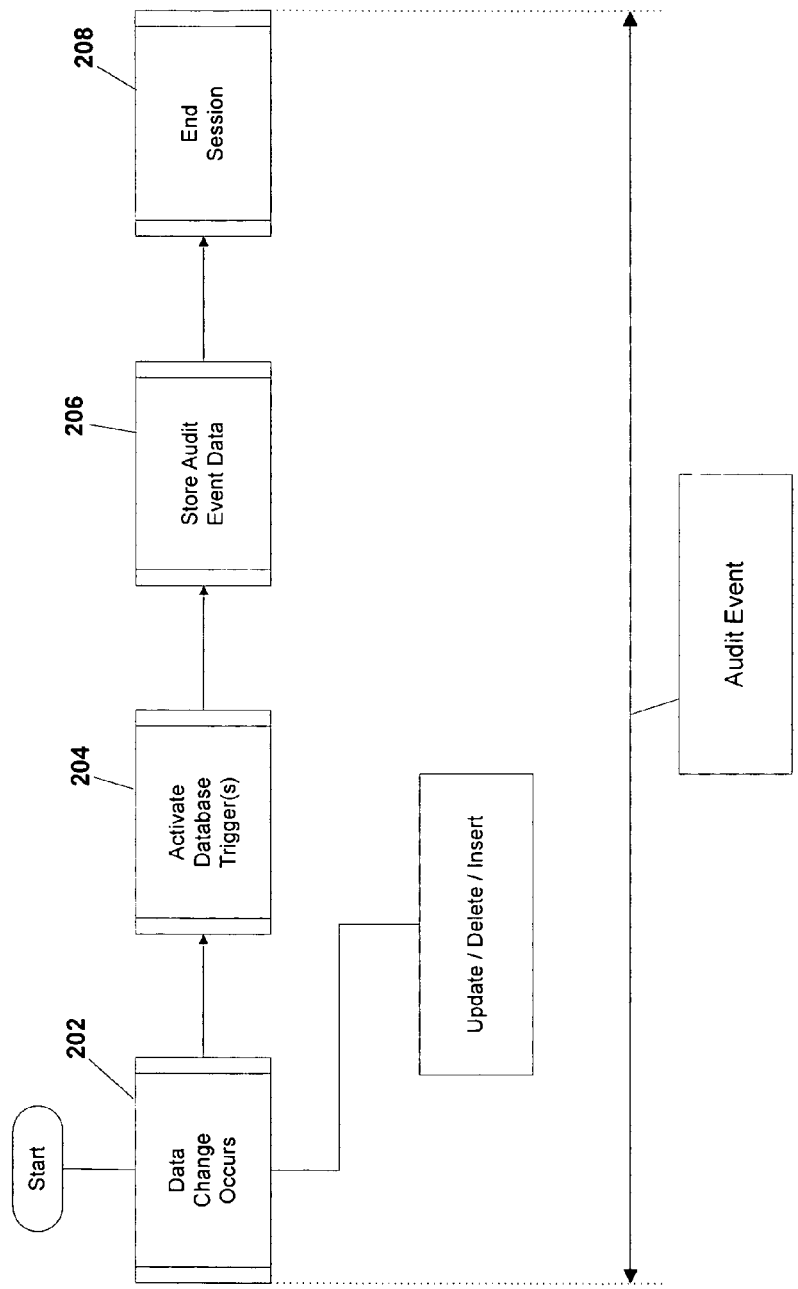
FIG. 2 includes a flow diagram of an auditing method that may be performed in association with an embodiment of the present invention.

Referring now to FIGS. 1 through 3, the interaction between an example of a transaction system 102 and an example of an auditing system 104 is illustrated in accordance with embodiments of the invention. The transaction system 102 includes a server 106 operatively associated with a database 108 which includes multiple operational tables 108A, 108B that store various data for the transaction system 102. The multiple operational tables 108A, 108B of the transaction system 102 are represented by "AuditedTableA" (108A) and "AuditedTableB" (108B). For convenience of disclosure, only two multiple operational tables 108A, 108B are illustrated; those skilled in the art can appreciate that more or less than this number of operational tables can be employed within the scope of the invention.

The transaction system 102 can be configured to facilitate and process financial transactions, for example, including permitting one or more users 110 to execute data changes in association with the financial data stored in the transaction system 102. In the context of a financial transaction system 102, one or more of the users 110 may be portfolio managers, investors, investment advisors, system administrators, and/or a variety of other types of users. The server 106 may be an SQL server executing a "Windows" type operating system, for example, or any other server or computer system suitable for managing and executing manipulation of data in the transaction system 102. Each of operational tables 108A, 108B may be operatively associated with one or more database triggers 114A, 114B of the audit system 104 that monitor data changes made to the operational tables 108A, 108B by users 110, for example, at step 202. During an audit event, the database triggers 114A, 114B activate at step 204 and cause the audit event data associated with data changes effected during the audit event to be stored at step 206. The audit event data may be stored in a database 116 including one or more audit history tables 116A, 116B that are operatively associated with the operational tables 108A, 108B. Thus, the capture and storage of audit event data derived from data changes made to the operational tables 108A, 108B may be initiated by trigger-initiated stored procedures. In various embodiments, static, pre-defined database triggers 114A, 114B may be implemented by the audit system 104 that monitor activity within the operational tables 108A, 108B and write to static, pre-defined audit history tables 116A, 116B, thereby substantially limiting run-time processing of the transaction system 102 to manipulation of current data in the operational tables 108A, 108B. The audit event is completed once the session ends (e.g., the user 110 logs out of the transaction system 102) at step 208.

One benefit of the audit system 104 is realized in the use of the audit history tables 116A, 116B to support the ability to generate a "knowledge date" for data in the transaction system 102. The transaction system 102 data can be searched and presented as it appeared on an historical date, without any corrections that were entered after that date, even if the correction was for an effective date before the specified historical date. This is a useful tool for reproducing customer statements and other reports as of the report creation date. Another benefit of maintaining separate audit history tables 116A, 116B for historical information is the ability to secure the tables 116A, 116B by conventional data security processes and devices. It can be seen that separating the function of the operational tables 108A, 108B from the function of the audit history tables 116A, 116B can minimize the operational overhead for maintaining historical information and audit event data. The audit system 104 may store all historical records in the separate audit history tables 116A, 116B, so that the transaction system 102 operational tables 108A, 108B contain only current data.

With reference to FIG. 3, the users 110 may communicate with the transaction system 102 and/or the audit system 104 with a variety of access devices 152 through a variety of communication media 154. Examples of access devices 152 that may be employed by the users 110 include, without limitation, computer systems 152A, personal digital assistants 152B, notebook computers 152C, and/or telephones 152D (of either wireline or wireless variety). Examples of communication media that can be employed include, without limitation, wireless data networks 154A, wireline networks 154B, and/or a variety of networked media 154C.

In operation of various embodiments of the invention, audit event data is captured and stored through application by the audit system 104 of an approach that involves row-versioning auditing methods, which are known to be an efficient model for processing, capturing and storing transaction-style rows of data. This approach may also include accepting row-level insert, update, and delete commands from users 110 and generating corresponding row insert, update and delete commands that create data entries in the operational tables 108A, 108B, the audit history tables 116A, 116B, and/or other tables (see discussion below). The schematic illustration of FIG. 4 displays an example of columns that may be associated with each of the operational tables 108A, 108B to facilitate the auditing processes described herein.

The audit system 104 may be configured to capture and summarize data changes arising from the operational tables 108A, 108B by category (e.g., portfolio, security, contact, etc.) so that the user 110 can review all data changes based on that category (e.g., a particular portfolio, security, or contact, etc.). It can be seen that this is advantageous in comparison to merely reviewing changes to each individual database record, for example. Examples of categories by which data changes may tracked include, without limitation, the following categories (and sub-categories): portfolio (settings and labels, transaction information, reconciliation information, associated contacts, registered representative membership, group and composite membership, performance history); contact (settings, addresses & phone numbers, associated manager, group membership, associated contacts, associated portfolios); market data (securities event dates, security prices, securities corporate reorganization definitions, index definitions, rates, currency definitions, exchange rates); users (settings, group membership, roles, data associations, profile settings, session history); system settings; global default settings; configurations; audit settings; report settings (associated styles, permissioning, menu membership); macro definitions; output creation; collection membership; automation packages; custodian interface definitions; field settings; custom field definitions; captions and display settings; and, general information (industry group, industry sector, asset class, withholding tax, currency, country, state, holiday, holiday schedule, exchange, brokerage, lot location).

The audit history tables 116A, 116B of the transaction system 102 may be represented by "AuditedTableA_Audit" (116A) and "AuditedTableB_Audit" (116B). The audit history tables 116A, 116B may be stored in the database 116 in the audit system 104 separate from and/or independent of the database 108 of the transaction system 102. An audit history table may be configured for each operational table for which auditing is desired. The audit history tables 116A, 116B let users 110 see how data in the transaction system 102 looked during prior time periods. The audit history tables 116A, 116B also serve as a data source from which archiving can be performed to permit archive systems and processes to work independently of the current data in the operational tables of the transaction system 102. The table of FIG. 5 illustrates examples of the columns that may be included in each of the audit history tables 116A, 116B to facilitate the auditing processes described herein. Also, the audit history tables 116A, 116B may contain the same columns or data fields as the operational tables, for example, in addition to the columns shown in FIG. 5.

In addition, an audit event table 118 (illustrated as "AuditEvent" table as shown in FIG. 1) may be included in the audit system 104 that includes a single row for each audited event. The audit event table 118 may be configured to track the user 110 who made data changes, a module 120 or other access tool the user 110 used, the time/date the data change was made, and/or a "JobID" if the event was caused by the actions of a script, for example. It can be seen that tracking the JobID permits backtracking to the actual parameters and log files for a batch process 122, for example, that may have created the audit event. The audit event table 118 permits grouping of all related table-level transactions together. The audit event table 118 also permits the audit system 104 to record relationships between individual transactions; for example, to record that a set of portfolio transactions comprise a repost request. The audit event table 118 also permits grouping together data changes that occur against multiple tables, but which may produce a single logical action or transaction; for example, posting a trade blotter transaction updates the status of the blotter row and inserts a transaction row. This information can be tracked by inserting one row in the audit event table 118 for each table affected by the audit event. The audit event table 118 may be configured such that only one row exists for each logical action even if it resulted in multiple transactions or data changes to multiple tables. In summary, the audit event table 118 tracks the tables that are affected by an audit event. With reference to FIG. 6, examples of columns that may be included in the audit event table 118 are shown.

In addition, an "AuditEventTable" table 124 may be included in the audit system 104. The "AuditEventTable" table 124 permits identification of the relationship between related row-level operations even if the operations are in different tables. The "AuditEventTable" table 124 lets the user 110 find all the table actions that comprise an audit event without searching through all the various individual operational tables 108A, 108B. With reference to FIG. 7, examples of columns that may be included in the "AuditEventTable" table 124 are shown.

The following examples illustrate how the audit event table 118, the "AuditEventTable" table 124, the operational tables 108A, 108B, and the audit history tables 116A, 116B may be populated by the audit system 104 during the auditing process to generate audit trail information. For convenience of illustration, a "PortfolioTransactions" table and a "PortfolioTransaction_Audit" table are used to represent auditing that can be performed on any row-audited or operational table. Many of the columns show text names or identification for purposes of readability. Also, the TimeStamp columns can contain time data as well as date information, but the time data has been omitted for convenience of disclosure. Those skilled in the art will appreciate that these examples are included primarily for the purpose of illustrating various aspects of the invention and are not necessarily intended to limit the scope of the invention.

With reference to FIGS. 8A through 8D, Joe adds two transactions to the transaction system 102: a buy transaction of IBM (via Post), and a buy transaction of MSFT (via the user interface). Each transaction places a row in the audit event table (FIG. 8A), the "AuditEventTable" table (FIG. 8B), and the PortfolioTransactions table (FIG. 8C). In this example, insert transactions have no impact on the "PortfolioTransaction_Audit" table (FIG. 8D).

With reference to FIGS. 9A through 9D, the next day Sue discovers that the buy transaction for MSFT (record T2) inserted by Joe on the previous day is erroneous and should be deleted. To reflect this deletion data change, the transaction is moved from the "PortfolioTransactions" table (FIG. 9C) to the "PortfolioTransaction_Audit" table (FIG. 9D) and its TypeOut, TimeStampOut, and AuditIDOut fields are updated. Also, a row is created in each of the audit event table (FIG. 9A) and the "AuditEventTable" table (FIG. 9B).

With reference to FIGS. 10A through 10D, the following day Bill finds out that the purchase IBM transaction (record 1) is incorrect: the amount should actually be 5000 instead of 500. To reflect this update, the audit system 104 copies the old contents of the row to the "PortfolioTransaction_Audit" table (FIG. 10C), and marks it with the date obsolete and updates the appropriate data in the "PortfolioTransaction" table (FIG. 10D). Changes corresponding to this update transaction are also reflected in the audit event table (FIG. 10A) and the "AuditEventTable" table (FIG. 10B), as shown.

FIGS. 11A through 11G illustrate the usefulness of the "AuditEventTable" table with respect to conducting an audit on multiple tables affected by an action or audit event. As shown, posting two requests in the "TradeBlotter" table (FIG. 11A) results in generation of the rows shown in the audit event table (FIG. 11B) and the "AuditEventTable" table (FIG. 11C). For purposes of this example, it is assumed that the "TradeBlotter" table (FIG. 11A) is a row-audited table and contains a Status column which may be set to New, Posted, or Rejected. When a trade blotter row is posted, first its status is set to Posted, and at a later time clean up processes delete the posted row and move it to an appropriate audit history table 116A, 116B. If a trade blotter row is rejected, then its status is simply updated to Rejected. Setting up auditing on the "TradeBlotter" table is useful for auditing who or what posted a transaction, as well as for auditing the history of the TradeBlotter record before it was posted. The data changes are captured as illustrated in FIGS. 11D through 11G. Processes performed with the "AuditEventTable" table, such as the update of the blotter row and the insertion of the transaction row, may be considered part of the same audit event. Accordingly, in certain embodiments of the invention, these data changes may be "undone" as a group given that the audit system 104 has captured the audit trail of the transactions used initially to create the data changes.

Those skilled in the art can appreciate that embodiments of the audit system 104 described herein can track substantially all changes that users and unattended application processes (e.g., batch processes 122) may make to the database 108 to promote a more comprehensive record of every data change that has occurred during an audit event within the transaction system 102. The audit system 104 can be implemented at the database level of the transaction system 102 to detect changes to the underlying data regardless of which web page, user interface, or other module 120 is used to make the data changes. The audit history tables 116A, 116B of the audit system 104 maintain records for substantially all inserts, updates, and/or deletes and enable the ability to review "before" and "after" data values as a result of data changes. In addition, the audit system 104 can determine the sequence of data changes that occurred during an audit event by maintaining a globally unique sequence number across audit system 104 records. Also, administrative changes such as adding or deleting users, creating or modifying roles, and changing user group assignments, for example, can be captured by the audit system 104 for subsequent audit purposes.

Referring now to FIGS. 12 through 18, various aspects of a sample audit trail viewer 126 that can be configured in accordance with the audit system embodiments of the present invention are illustrated are shown by way of various screen displays.

Figure 12:
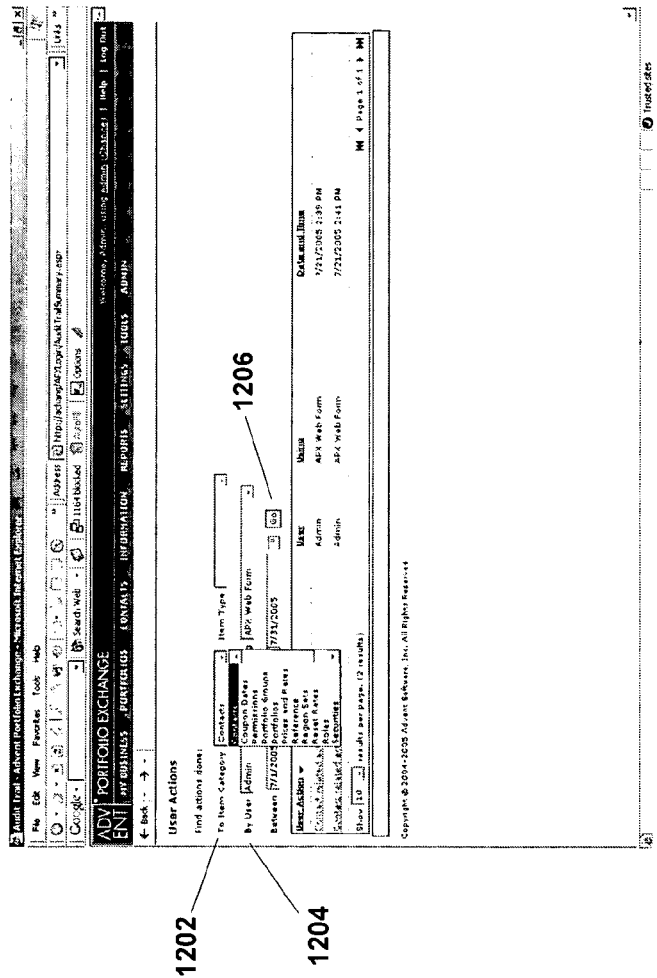

As shown in the screen display of FIG. 12, the user 110 can query the audit system 104 for an audit event for a given category 1202, by a particular user 1204, and/or for a given time period 1206.

Figure 13:
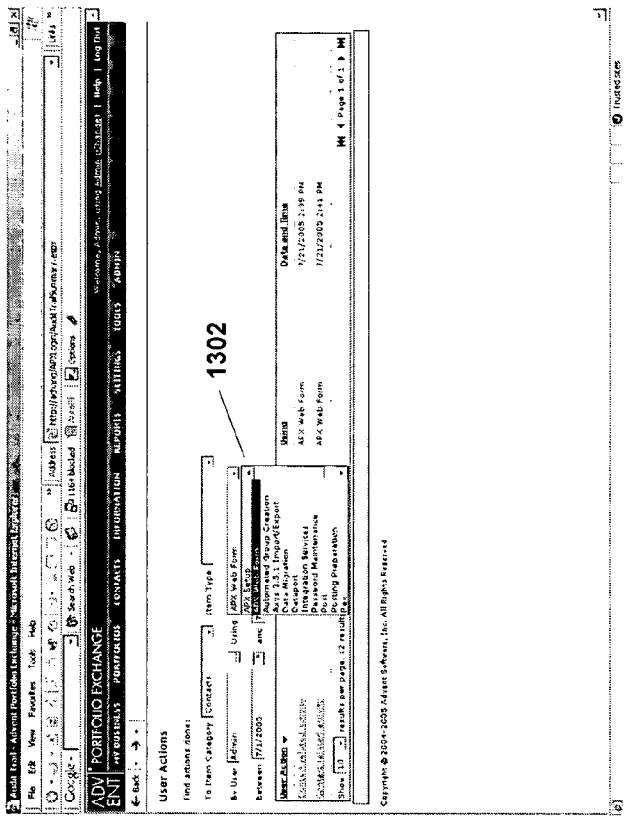

With reference to FIG. 13, the audit system 104 can be queried by a particular module 1302 or other tool that was employed by the user 110 to effect a data change in the transaction system 102.

Figure 14:
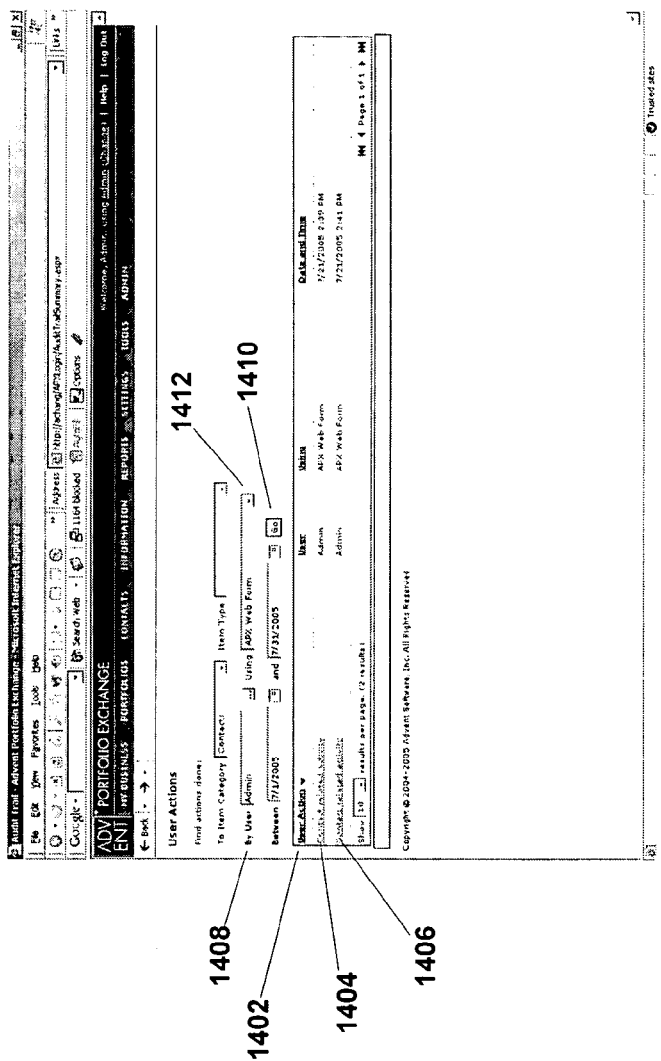

As shown in FIG. 14, the audit trail viewer 126 returns the results of the query entered by the user 110. The results include two "User Actions" 1402 of "Contact related activity" 1404, 1406 that were performed by the "Admin" user 1408 in the time period 1410 of "7/1/2005" through "7/31/2005" by using the "APX Web Form" module 1412.

Figure 15:
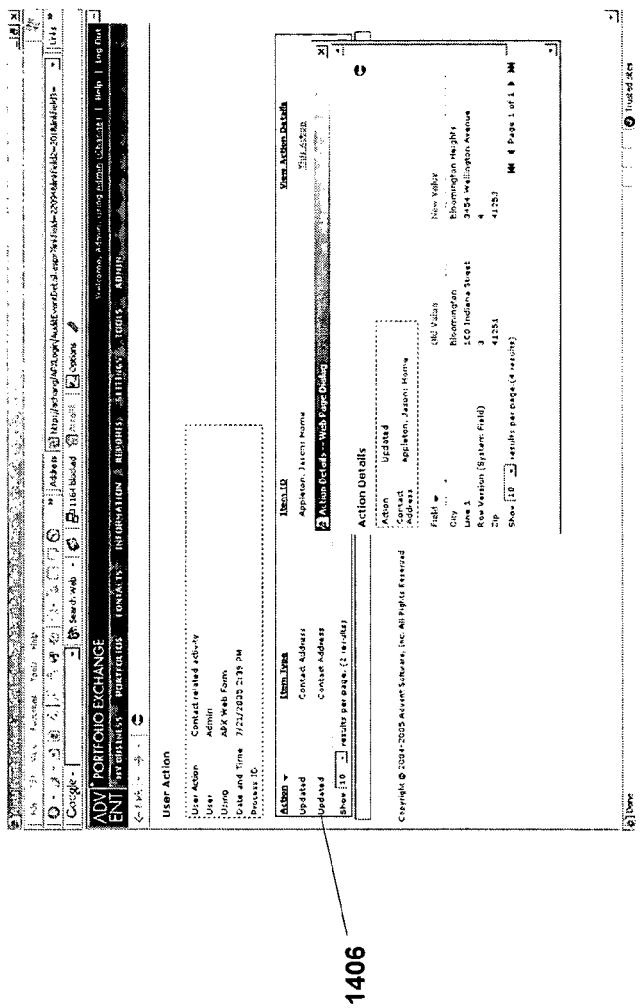

With reference to FIG. 15, the user 110 may select one of the "User Actions" 1406 (see FIG. 14) and see a more detailed overview of the field-level changes that occurred in connection with the particular "User Action" 1406.

Figure 16:
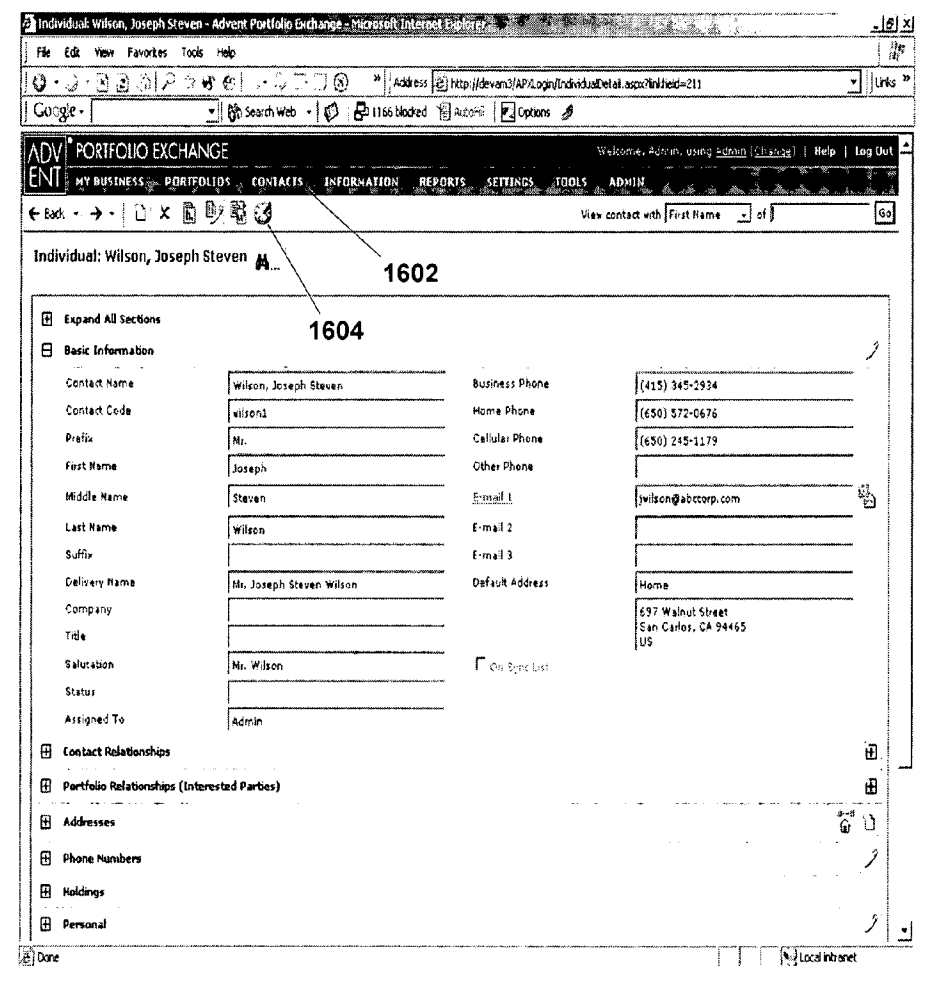

By selecting the "Contacts" link 1602, the screen display of FIG. 16 is presented for viewing by the user 110, which includes "Basic Information" for a given contact. By clicking on a sundial icon 1604, the full history of data changes to the contact can be displayed, as shown in FIG. 17 for the "Individual" 1702, "Addresses" 1704, and "Phone Numbers" 1706 sections of the screen display.

Figure 17:
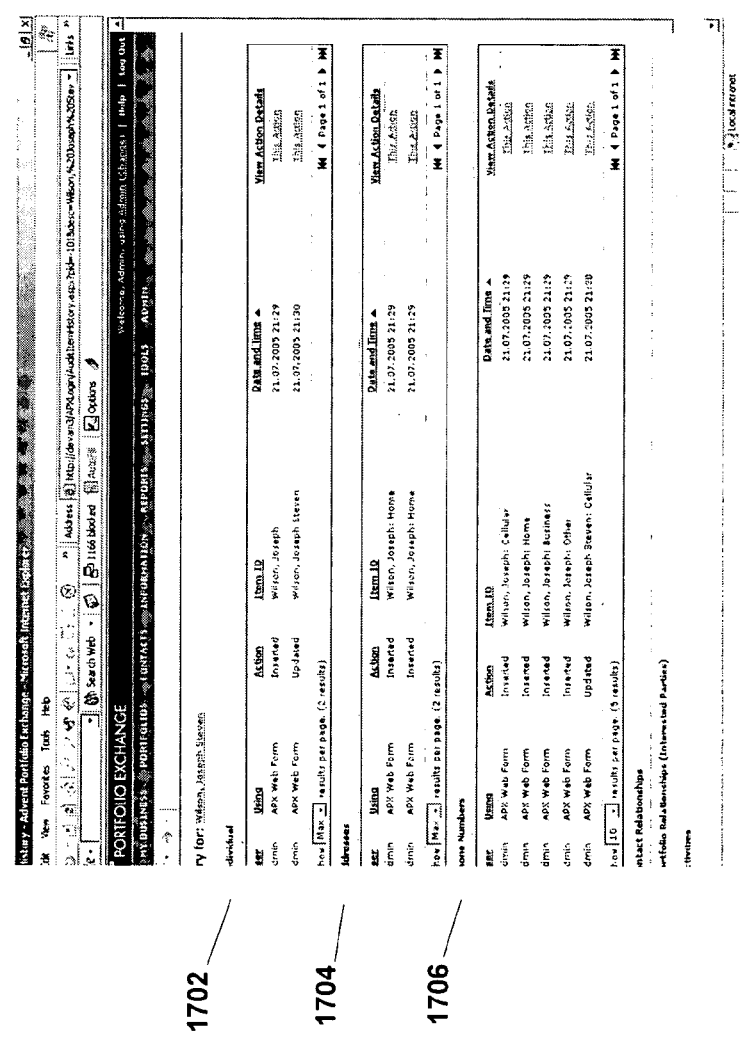
Figure 18:
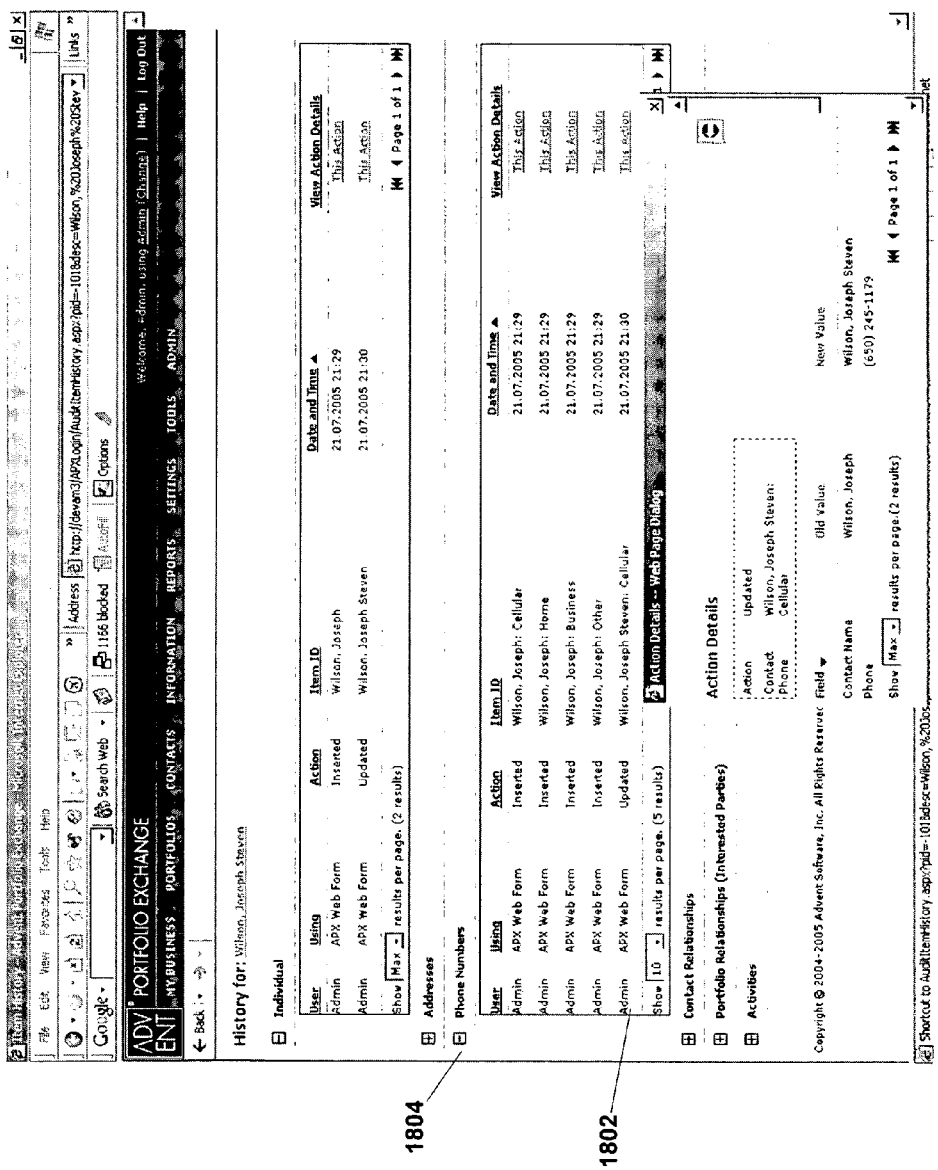

With reference to FIG. 18, the user may click and drill down through any of the line item entries on the screen display of FIG. 17. As shown, a section of FIG. 18 illustrates more details associated with the "Updated" action 1802 that was previously performed on the "Phone Numbers" category 1804 for the given contact.

Audit systems 104 provided in accordance with the present invention may store portfolio definitions, for example, in one table and the transactions associated with each portfolio in a separate table. In connection with performing a search for all portfolios in the transaction system 102 that have changed, the audit trail viewer 126 can display all portfolios whose definitions have changed as well as portfolios whose definitions have not changed but whose transactions have changed. In other words, the audit trail viewer 126 lets users 110 search for changes at a summary level, such as portfolios, contacts, and securities, for example.

It can be seen that embodiments of the audit trail viewer 126 permit users 110 to review a variety of different audit event data and audit trail information. Users 110 can interactively specify search criteria and view resulting audit trail information that matches the search criteria. With the audit trail viewer 126, users 110 can search for specific users 110 that made a change, actions or data changes that were performed in the transaction system 102 (e.g., insertions, updates, deletions), types of data changed (e.g, portfolio, contact, security), and/or when actions or data changes were performed. In various embodiments, users 110 may be permitted to cut and paste data from sections of the audit trail viewer 126 to transfer transactions into a trade blotter, for example, to reverse or re-post transactions. The audit trail viewer 126 includes a user interface that can find events by user 110, module 120, time span, object modified, or specific field values defined as search criteria by the user 110.

The audit trail viewer 126 also provides information on actions to specific data types, including the ability to look for all actions done to a specific type of data (e.g, portfolio transactions), or to a rolled up data type (e.g, portfolio data including settings, transactions, reinvestment exceptions, etc.). For example, if a securities prices update utility is executed in the transaction system 102 that loads prices from a market data provider, that audit event can be configured to appear as a single event in the audit trail viewer 126, even though it made multiple updates to individual prices. The user 110 can then drill-down into the rolled up audit event if desired. In another example, a security update may add dozens of put and call dates into the transaction system 102 and the update of the put and call schedule can be considered a single action or audit event; the user 110 can be permitted to drill down into the data to see the individual put and call dates that were added by the update. The capability of the audit trail viewer 126 to initially display rolled-up summaries of audit events that updated multiple rows in the database 108 provides support for ready data error detection without presenting the user 110 with a high volume of detail data upon an initial search query.

In various embodiments, the audit trail viewer 126 also facilitates aberrant action scanning, or the ability to look for unusual actions or data changes in the transaction system 102 that may be suspicious or require further investigation. To support aberrant action scanning, the audit trail viewer 126 can be configured to provide data entry for search criteria by field value. For example, portfolio transactions can be searched for quantity entries of greater than 50,000 shares. The audit system 104 and the audit trail viewer 126 also facilitate an understanding of object history, or the ability to look at all actions to a specific object (e.g, portfolio, security, etc.) over a given period of time. The audit trail viewer 126 can also be employed to display line item history, or the ability to look at all actions to a specific line item, such as a given row in the database 108 of the transaction system 102, to see what revisions were made to the row over time. Examples of additional activities that can be performed with the audit trail viewer 126 include, without limitation: security master—who changed the interest rate for a particular security and when; prices—what prices were manually updated today and by whom; performance updates—who last updated performance calculations for a portfolio and when; client demographics—when was a client's mailing address changed and by whom.

Various other features may be implemented in connection with embodiments of the audit system 104. The audit trail viewer 126 may be configured with the ability to add to a query the restriction of a given field being set to a given value (e.g, where a stock or security symbol is "IBM"). The capability to turn-off auditing of certain fields on specific tables may also be provided. For example, the audit system 104 may be configured such that all changes to all fields on the "PortfolioTransactions" table should always be audited; conversely, other tables such as look-up tables for country and state names, for example, may be configured not to be audited. In addition, the audit system 104 can be employed to designate tables for which administrators may want to audit changes to some fields but not to other fields. This may be accomplished by storing column identifiers that should be audited in a table, and when a request is received to update the table, the audit system 104 can check to determine whether any of the fields being updated are in the list of column identifiers to be audited. The audit system 104 may also be configured for exception-based auditing, or auditing data only when an exceptional audit event happens, such as a manual adjustment to an automatic data feed or batch process 122. The audit system 104 may also be configured with the capability to "undo" actions and data changes when logically possible, as well as the capability to "backtrack" sources of transactions (e.g., backtrack the blotter entry that caused a transaction row). In various embodiments of the audit system 104, rules-based alerts can be generated and notifications can be communicated when specific business situations are identified in the audit event data. For example, a notification may be generated and communicated by the audit system 104 when the quantity in a transaction is adjusted by more than 50% of its original value. Other automated processes can be initiated based on the audit event data such as, for example, automatically updating performance calculations after transactions are manually updated.

With regard to various security features, the audit system 104 may store "Windows" or other operating system credentials in the audit event data: in addition to storing a user ID, for example, storing operating system user information may help detect invalid users 110. In addition, the audit system 104 may store operating system identifiers and process/application identifiers to facilitate detection of direct (and possibly unauthorized) database 108 access from outside of the transaction system 102. To promote preservation of the veracity of audit trail information, the audit system 104 may be configured with non-repudiation measures such as data encryption with user 110 private key information, for example. In certain embodiments, system administrators can address tampering with audit trail information, while still providing direct database 108 access to the operational tables 108A, 108B, by locking down access to the audit history tables 116A, 116B to prevent direct updates, deletions, or other modifications to the audit event data.

Those skilled in the art will appreciate the many benefits of the various embodiments of the present invention. The audit systems, processes, and tools described herein permit the user to respond to specific portfolio inquiries, track down incorrect manual data entries, and verify compliance with corporate or regulatory policies. Embodiments of the invention enable system administrators and other management personnel to effectively and efficiently identify what process or person made what data changes in a transaction system during a given time period. The audit systems may be configured to capture substantially all data insertions, deletions, and updates, including before and after field values, along with information associated with the interface or other functionality used to effect the data changes. These systems may capture and present audit trail information within the context of the application, and data changes may be rolled up both to an application context (such as a portfolio or contact), or through a logical unit of work session as defined by the user. The audit systems can employ separate storage of audit event data from operational tables for enhanced transaction system response time and performance. The audit trail data structures may be readily configured as analogous to operational data structures to enable enhanced data access and correlation with operational data in the transaction system. In addition, embodiments of the audit trail viewer described herein provide a centralized audit trail interface to find and display data changes, through any combination of user, date/time, data type, and/or operation.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. An audit computer system structured for auditing at least one operational table of a transaction computer system for an audit event, the audit computer system comprising:
   at least one audit history table operatively associated with the operational table of the transaction computer system, the audit history table including at least one database trigger configured for monitoring one or more data changes in the operational table;
   the audit history table being configured to store substantially all data changes which occur in the transaction computer system during the audit event by storing the data changes in the audit history table as audit event data;
   the audit history tables being configured to function separately from the operational tables of the transaction computer system;
   at least one audit event table operatively associated with at least one of the audit history tables and the associated operational table, the audit event table being configured for associating the data changes with the audit event, wherein the audit event table groups together a plurality of data changes that occur against multiple tables which produce a single logical transaction; and,
   at least one representation of the data of an operational table as it appeared on a historical date generated by the operational interaction of the at least one audit history table, the at least one audit event table, and the at least one operational table.

2. The audit computer system of claim 1, wherein the transaction computer system includes a financial transaction system.

3. The audit computer system of claim 1, further comprising the audit history tables being configured to store the data changes by category.

4. The audit computer system of claim 1, further comprising the audit event table being configured to track at least one of a user who made the data changes, a module used to make the data changes, a time the data changes were made, a date the changes were made, or a job identifier.

5. The audit computer system of claim 1, further comprising a table configured to track all operational tables associated with the audit event.

6. The audit computer system of claim 1, further comprising the audit history tables being configured to maintain at least one globally unique sequence number in association with the data changes of the audit event.

7. The audit computer system of claim 1, further comprising an audit trail viewer operatively associated with the audit history tables, the audit trail viewer being configured for displaying at least one summary of the audit event data.

8. The audit computer system of claim 7, further comprising the audit trail viewer being configured for displaying "before" and "after" data values.

9. The audit computer system of claim 7, further comprising the audit trail viewer being configured for querying the audit system by at least one of a category, a user, a time period, or a module.

10. The audit computer system of claim 7, further comprising the audit trail viewer being configured to provide a detailed overview of field-level data changes that occurred in connection with the audit event.

11. The audit computer system of claim 7, further comprising the audit trail viewer being configured to permit cut and paste data operations from sections of the audit trail viewer.

12. The audit computer system of claim 7, wherein the summary includes a rolled-up summary.

13. The audit computer system of claim 1, further comprising the audit computer system being configured for exception-based auditing.

14. The audit computer system of claim 1, further comprising the audit computer system being configured with the capability to undo the data changes associated with the audit event.

15. The audit computer system of claim 1, further comprising the audit computer system being configured to generate at least one notification based on identification of a business situation in the audit event data.

16. The audit computer system of claim 1, wherein the audit history table stores the data changes using a row-versioning method for storing the data changes in the audit history table as audit event data.

17. A method using a computer system for auditing at least one operational table of a transaction computer system for an audit event, the method comprising:
   monitoring with a computer system one or more data changes in the operational table of the transaction computer system using at least one database trigger operatively associated with an audit history table;
   storing substantially all data changes which occur in the transaction computer system during the audit by storing the data changes in the audit history table as audit event data;
   permitting the audit history tables to function separately from the operational tables of the transaction computer system;
   grouping, using the computer system, together a plurality of data changes that occur against multiple tables which produce a single logical transaction in an audit event table: and,
   generating at least one representation of the data of an operational table as it appeared on a historical date by the operational interaction of the audit history table, the audit event table, and the at least one operational table.

18. The method of claim 17, further comprising storing the data changes by category.

19. The method of claim 17, further comprising tracking at least one of a user who made the data changes, a module used to make the data changes, a time the data changes were made, a date the data changes were made, or a job identifier.

20. The method of claim 17, further comprising storing the data changes using a row-versioning method for storing the data changes in the audit history table as audit event data.

21. A computer-readable memory medium including computer-executable instructions for auditing at least one operational table of a transaction computer system for an audit event, comprising:
   instructions for monitoring one or more data changes in the operational table of the transaction computer system including at least one database trigger operatively associated with an audit history table;
   instructions for storing substantially all data changes which occur in the transaction computer system during the audit event including instructions for storing the data changes in the audit history table as audit event data;
   instructions for permitting the audit history tables to function separately from the function of the operational tables of the transaction computer system;
   instructions for grouping together a plurality of data changes that occur against multiple tables which produce a single logical transaction in an audit event table; and,
   instructions for generating at least one representation of the data of an operational table as it appeared on a historical date by the operational interaction of the audit history table, the audit event table, and the at least one operational table.

22. The computer readable memory medium in claim 21, further comprising instructions for storing the data changes using a row-versioning approach for storing the data changes in the audit history table as audit event data.

* * * * *